(12) United States Patent
Wang

(10) Patent No.: US 10,969,239 B2
(45) Date of Patent: *Apr. 6, 2021

(54) SYSTEMS AND METHODS FOR DETERMINING A POINT OF INTEREST

(71) Applicant: BEIJING DIDI INFINITY TECHNOLOGY AND DEVELOPMENT CO., LTD., Beijing (CN)

(72) Inventor: Ziyi Wang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/895,091

(22) Filed: Jun. 8, 2020

(65) Prior Publication Data

US 2020/0300657 A1  Sep. 24, 2020

Related U.S. Application Data

(63) Continuation of application No. 15/822,253, filed on Nov. 27, 2017, now Pat. No. 10,712,170, which is a (Continued)

(30) Foreign Application Priority Data

Apr. 12, 2016 (CN) .......................... 201610229144.3

(51) Int. Cl.
*G01C 21/36* (2006.01)
*G06F 16/29* (2019.01)
*G06F 16/00* (2019.01)

(52) U.S. Cl.
CPC ......... *G01C 21/3682* (2013.01); *G06F 16/00* (2019.01); *G06F 16/29* (2019.01)

(58) Field of Classification Search
CPC ...... G01C 21/3682; G06F 16/00; G06F 16/29
See application file for complete search history.

(56) References Cited

U.S. PATENT DOCUMENTS 8,719,198 B2 * 5/2014 Zheng .................. G01C 21/20
706/21
9,009,177 B2   4/2015 Zheng et al.
(Continued)

FOREIGN PATENT DOCUMENTS

CN    102651026 A    8/2012
CN    103150309 A    6/2013
(Continued)

OTHER PUBLICATIONS

First Office Action in Chinese Application No. 201610229144.3 dated Apr. 3, 2020, 16 pages.
(Continued)

*Primary Examiner* — Babar Sarwar
(74) *Attorney, Agent, or Firm* — Metis IP LLC

(57) ABSTRACT

A method for searching a point of interest (POI) around a location is provided. The method includes receiving information relating to a target location associated with a user from a terminal and determining a target geocode value relating to the target location. The method also includes obtaining a geocode structure for determining POIs. The method further includes determining at least one POI relating to the target location based on the geocode structure and the target geocode value.

20 Claims, 7 Drawing Sheets

Related U.S. Application Data continuation of application No. PCT/CN2017/080218, filed on Apr. 12, 2017.

(56) References Cited

U.S. PATENT DOCUMENTS

| | | | | |
|---|---|---|---|---|
| 2009/0070293 | A1* | 3/2009 | Vechersky | G06F 16/29 |
| 2010/0225756 | A1* | 9/2010 | Miyata | G01C 21/3602 |
| | | | | 348/116 |
| 2010/0311336 | A1* | 12/2010 | Huotari | H04M 3/38 |
| | | | | 455/41.3 |
| 2011/0081922 | A1* | 4/2011 | Chandra | H04W 64/006 |
| | | | | 455/457 |
| 2012/0173500 | A1* | 7/2012 | Chakrabarti | G06F 16/13 |
| | | | | 707/706 |
| 2012/0226889 | A1* | 9/2012 | Merriman | G06F 16/2264 |
| | | | | 711/216 |
| 2014/0006411 | A1* | 1/2014 | Boldyrev | G06F 16/2264 |
| | | | | 707/741 |
| 2014/0132767 | A1* | 5/2014 | Sonnabend | G06K 9/00476 |
| | | | | 348/148 |
| 2014/0280318 | A1* | 9/2014 | Simms | G06F 16/29 |
| | | | | 707/769 |
| 2015/0052124 | A1* | 2/2015 | Pegg | G06F 16/2246 |
| | | | | 707/724 |
| 2015/0261785 | A1 | 9/2015 | Ma et al. | |
| 2015/0278277 | A1* | 10/2015 | Agrawal | H04W 64/00 |
| | | | | 707/746 |

FOREIGN PATENT DOCUMENTS

| | | |
|---|---|---|
| CN | 103279560 A | 9/2013 |
| CN | 103383682 A | 11/2013 |
| CN | 104199860 A | 12/2014 |
| CN | 104516950 A | 4/2015 |
| CN | 105404685 A | 3/2016 |
| CN | 105468631 A | 4/2016 |
| CN | 106156138 A | 11/2016 |
| JP | 2013196151 A | 9/2013 |
| TW | I515412 B | 1/2016 |
| WO | 2007048015 A2 | 4/2007 |

OTHER PUBLICATIONS

International Search Report or PCT/CN2017/080218 dated Jul. 12, 2017, 4 pages.
Written Opinion for PCT/CN2017/080218 dated Jul. 12, 2017, 4 pages.
First office action in Taiwan application No. 106112449 dated Jan. 2, 2018, 20 pages.
Examination Report in Australian Application No. 2017250221 dated Nov. 19, 2018, 4 pages.
The extended European search report in European Application No. 17781892.9 dated Dec. 19, 2018, 10 pages.
Notification of Reasons for Refusal in Japanese Application No. 2017-562349 dated Jan. 19, 2019, 6 pages.
Masashi Katsumata, Google API Expert explains Google Maps API programming guide,01: 278-288, 2011.

* cited by examiner

SYSTEMS AND METHODS FOR DETERMINING A POINT OF INTEREST

CROSS-REFERENCE TO RELATED APPLICATIONS

This application is a continuation application of U.S. patent application Ser. No. 15/822,253, filed on Nov. 27, 2017, which is a continuation of International Application No. PCT/CN2017/080218, filed on Apr. 12, 2017, which claims priority of Chinese Application No. 201610229144.3 filed on Apr. 12, 2016, the entire contents of each of which are hereby incorporated by reference.

TECHNICAL FIELD

This application relates generally to systems and methods for searching data, and more particular, systems and methods for searching a point of interest (POI) around a location.

BACKGROUND

With the development of the information technology, electronic products become more and more popular, and the amount of data needed are becoming huger and huger. Therefore, to satisfy a user's need for the huge data, the speed of searching data is more and more important.

SUMMARY

According to an aspect of the present disclosure, a system may include one or more storage media and a processor configured to communicate with the one or more storage media. The one or more storage media may include a set of instructions for determining a point of interest (POI). When executing the set of instructions, the processor may be directed to perform one or more of the following operations. The processor may receive information relating to a target location associated with a user from a terminal. The processor may determine a target geocode value relating to the target location. The processor may obtain a geocode structure for determining POIs. The processor may determine at least one POI relating to the target location based on the geocode structure and the target geocode value.

According to another aspect of the present disclosure, a method for determining a POI may include one or more of the following operations. A first processor may receive information relating to a target location associated with a user from a terminal. The first processor may determine a target geocode value relating to the target location. The first processor may obtain a geocode structure for determining POIs. The first processor may determine at least one POI relating to the target location based on the geocode structure and the target geocode value.

According to yet another aspect of the present disclosure, a non-transitory computer readable medium embodying a computer program product, the computer program product comprising instructions configured to cause a computing device to receive, from a terminal, information relating to a target location associated with a user. The computer program product includes instructions also configured to cause the computing device to determine a target geocode value relating to the target location. The computer program product includes instructions further configured to cause the computing device to obtain a geocode structure for determining POIs and determine at least one POI relating to the target location based on the geocode structure and the target geocode value.

In some embodiments, the first processor may determine a target longitude value of the target location and a target latitude value of the target location based on the information relating to the target location associated with the user and determine the target geocode value relating to the target location based on the target longitude value of the target location and the target latitude value of the target location by using an encoding technique.

In some embodiments, the encoding technique includes a Geohash technique.

In some embodiments, the geocode structure includes a geocode tree structure.

In some embodiments, the first processor may determine the at least one POI relating to the target location based on the geocode tree structure and the target geocode value.

In some embodiments, the first processor may obtain a search radius. The first processor may determine a coding length based on the search radius. The first processor may determine at least one related geocode value in the geocode tree structure based on the target geocode value and the coding length. The first processor may determine the at least one POI based, at least in part, on the at least one related geocode value.

In some embodiments, the first processor may determine the at least one related geocode value based on a Hash search.

In some embodiments, the first processor may determine a neighboring location geocode value corresponding to the target location and the at least one POI relating to the target location based, at least in part, on the neighboring location geocode value.

According to another aspect of the present disclosure, a method for generating a geocode structure may include one or more of the following operations. A second processor may obtain a plurality of sample locations from a storage device. The second processor may determine a sample longitude value and a sample latitude value for each of the plurality of sample locations, a sample geocode value for the each of the plurality of sample locations based on the sample longitude value of the each of the plurality of sample locations and the sample latitude value of the each of the plurality of sample locations. The second processor may generate a plurality of nodes of the geocode structure based on the sample geocode values. The second processor may save the geocode structure into the storage device.

In some embodiments, the second processor may associate one or more sample POIs to each of the sample geocode values in the geocode structure.

In some embodiments, the second processor may determine a Hash index for the plurality of nodes of the geocode tree structure.

In some embodiments, the geocode structure includes a Trie tree structure.

In some embodiments, the first processor and the second processor are different.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
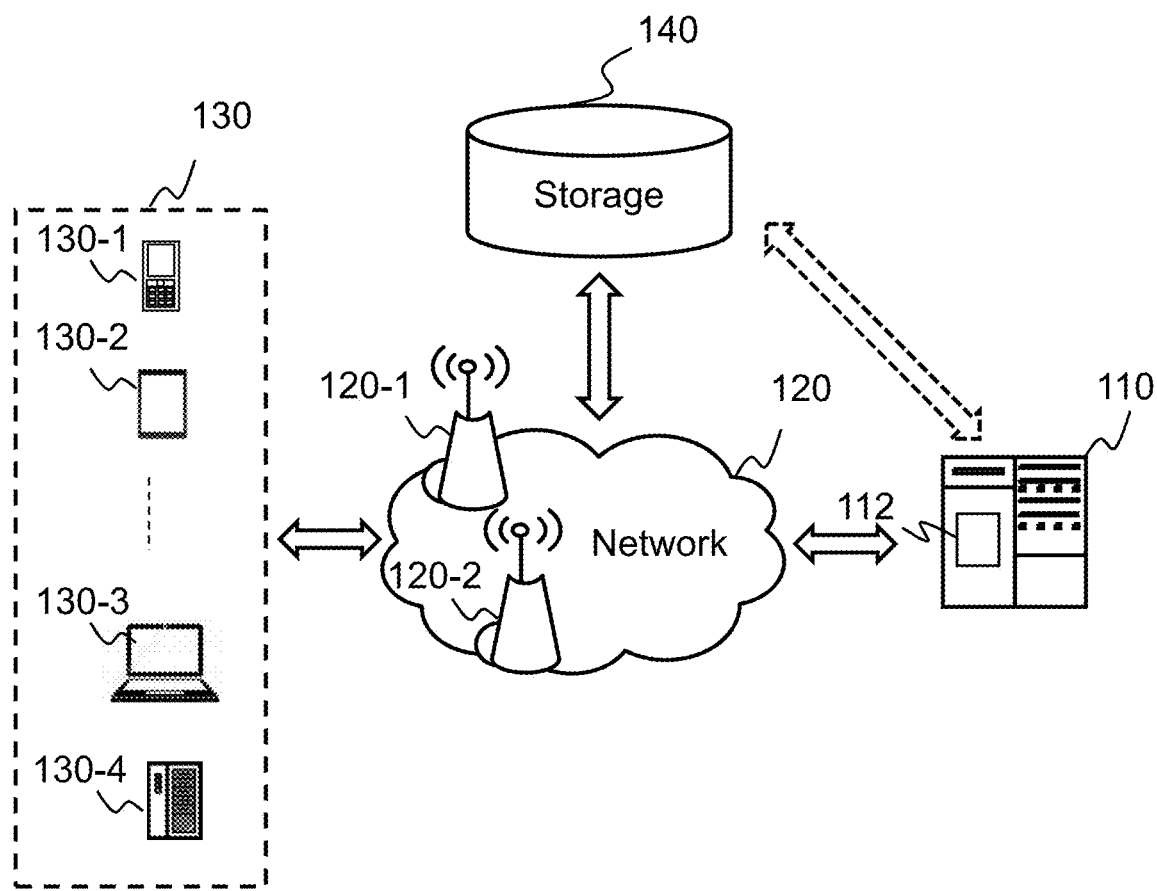
FIG. 1 is a block diagram of an exemplary system for determining POI according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to determining POI associated with a target location, it should also be understood that this is only one exemplary embodiment. The system or method of the present disclosure may be applied to any other kinds of on demand service. For example, the system or method may be applied to a navigation system. A user may initiate a request for POI associated with a location (e.g., a location of the user, a location designated by the user). As another example, the system or method of the present disclosure may be applied to a transportation system of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a web page, a plug-in of a browser, a client terminal, a custom system, an internal analysis system, an artificial intelligence robot, or the like, or any combination thereof.

The term "user" in the present disclosure may refer to an individual, an entity that may request a service, order a service, provide a service, or facilitate the providing of the service. For example, the user may be a passenger, a driver, an operator, or the like, or any combination thereof. The term "user terminal" in the present disclosure may refer to a tool that is used by the user to request or order a service or receive a result corresponding to the service. For example, when a user requests for some POIs around a location, the system may transmit a result (e.g., a plurality of POIs) to the user terminal. In some embodiments, the user terminal may include a passenger terminal or a driver terminal. For example, when a passenger requests for a vehicle, he or she may initiate an order including a starting location and a destination. When he or she inputs the starting location through a passenger terminal, the system may determine the destination based on the starting location without receiving the destination input by the passenger. Further, the system may provide a plurality of POIs around the destination to the passenger through the passenger terminal. As another example, when a driver finished an order or waits for an order at a location, the system may provide a plurality of POIs around the location of the driver, the driver may determine to go to a next location to have a new order easily based on the POIs. In some embodiments, the POI may include information relating to a location. The information relating to a location may include a name of a location, a coordinate of the location (e.g., a longitude value, or latitude value), an address of the location (e.g., state, province, city, district, road, house number), a telephone number relating to the location, a promotional activity, or other types around the location, such as hospitals, schools, parks, roads, bridges, rivers, lakes, mountains, railway stations, airports, companies, residential communities, hotel scenic, spots, or the like, or any combination thereof.

The term "service request" and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for determining a point of interest associated with a location. To this end, the online on-demand service platform may first obtain a target location associated with a user; and then through traversing a geocode structure to determine the POI(s) around the target location. Since each geocode value in the geocode structure is associated with a plurality of POIs in advance, the user may get the POI(s) around the target location easily.

It should be noted that Location Based Service (LBS) for online on-demand service is a new form of service rooted only in post-Internet era. It provides technical solutions to users that could raise only in post-Internet era. In pre-Internet era, GPS or navigation technology are not available. If a service requester needs to know a POI around a location, he or she may go to the location personally or ask other. The POI around a location may be difficult for the service requester to find without the GPS and navigation technology. The LBS for online on-demand service, however, may allow the service requester to find the POI more easily. Therefore, through the Internet, the LBS for online on-demand service may provide a much more efficient service for the service requester, which may never occur in the traditional pre-Internet era.

FIG. 1 is a block diagram of an exemplary on-demand service system 100 according to some embodiments. The on-demand service system 100 may be an online navigation service platform for determining one or more POIs around a location. The on-demand service system 100 may be an online platform including a server 110, a network 120, a user terminal 130, and a storage 140.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the user terminal 130 and/or the storage 140 via the network 120. As another example, the server 110 may connect to the user terminal 130 and/or the storage 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions of the server 110 described in the present disclosure. For example, the processing engine 112 may determine a POI associated with a target location (e.g., a POI around the target location) through traversing a geocode structure. In some embodiments, the processing engine 112 may include one or more processors (e.g., single-core processor(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data between the components of the on-demand service system 100. In some embodiments, one or more components in the on-demand service system 100 (e.g., the server 110, the user terminal 130, and the storage 140) may transmit information and/or data to other component(s) in the on-demand service system 100 via the network 120. For example, the server 110 may receive a service request from the user terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, etc., through which one or more components of the on-demand service system 100 may connect to the network 120 to exchange data and/or information between them.

In some embodiments, the user terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glasses, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass, an Oculus Rift, a Hololens, a Gear VR, etc. In some embodiments, the built-in device in the motor vehicle 130-4 may include an onboard computer, an onboard television, etc. In some embodiments, the user terminal 130 may be a device with positioning technology for locating the position of the service requester and/or the user terminal 130.

The storage 140 may store data and/or instructions. In some embodiments, the storage 140 may store data obtained from the user terminal 130 and/or the network 120. In some embodiments, the storage 140 may store data and/or instructions that the server 110 may execute or use to perform exemplary methods described in the present disclosure. In some embodiments, storage 140 may include mass storage, removable storage, volatile read-and-write memory, read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 140 may connect to the network 120 to communicate with one or more components of the on-demand service system 100 (e.g., the server 110, the user terminal 130). One or more components in the on-demand service system 100 may access the data or instructions stored in the storage 140 via the network 120. In some embodiments, the storage 140 may connect to or communicate with one or more components of the on-demand service system 100 (e.g., the server 110, the user terminal 130). In some embodiments, the storage 140 may be part of the server 110.

In some embodiments, one or more components of the on-demand service system 100 (e.g., the server 110, the user terminal 130) may have permission to access the storage 140. In some embodiments, one or more components of the on-demand service system 100 may read and/or modify information relating to the user. For example, the server 110 may read and/or modify one or more users' information after a service.

In some embodiments, information exchange between the components of the on-demand service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used on software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. The vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

Figure 2:
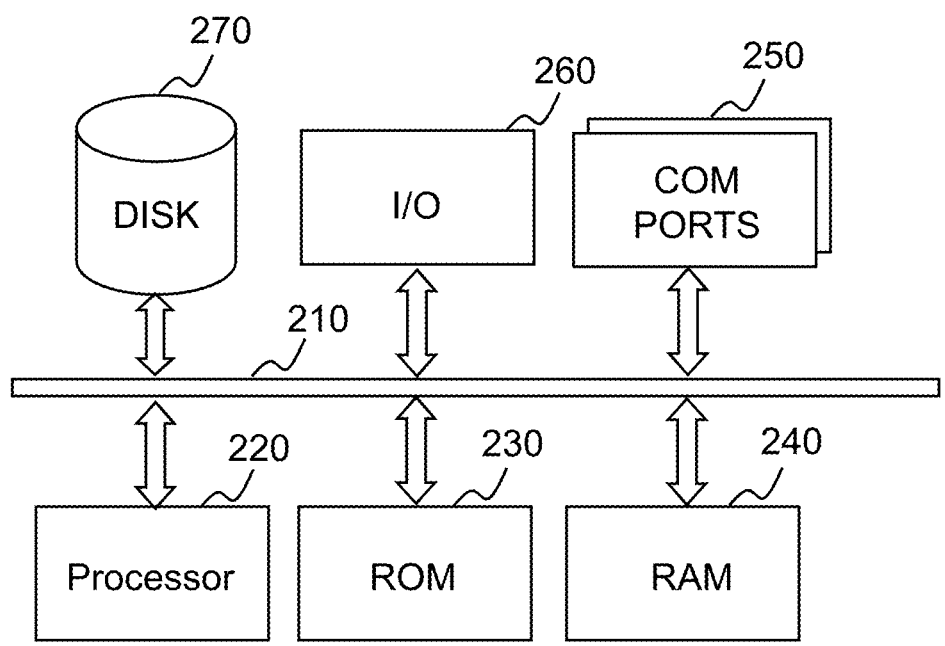
FIG. 2 is a block diagram of an exemplary computing device in the system illustrated in FIG. 1 according to some embodiments of the present disclosure.

FIG. 2 is a schematic diagram illustrating exemplary hardware and software components of a computing device 200 on which the server 110, the user terminal 130, and/or the storage 140 may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special-purpose computer, and both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor 220, in the form of one or more processors, for executing program instructions. The exemplary computing device may include an internal communication bus 210, program storage and data storage of different forms, including, for example, a disk 270, and ROM 230, or RAM 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

The computing device 200 may also include a hard disk controller communicated with a hard disk, a keypad/keyboard controller communicated with a keypad/keyboard, a serial interface controller communicated with a serial peripheral equipment, a parallel interface controller communicated with a parallel peripheral equipment, a display controller communicated with a display, or the like, or any combination thereof.

Merely for illustration, only one CPU and/or processor is described in FIG. 2. Multiple CPUs and/or processors are also comtemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, step A and step B can also be performed by two different CPUs and/or processors jointly or separately in the computing device 200 (e.g., the first processor executes step A and the second processor executes step B, or the first and second processors jointly execute steps A and B).

Figure 3:
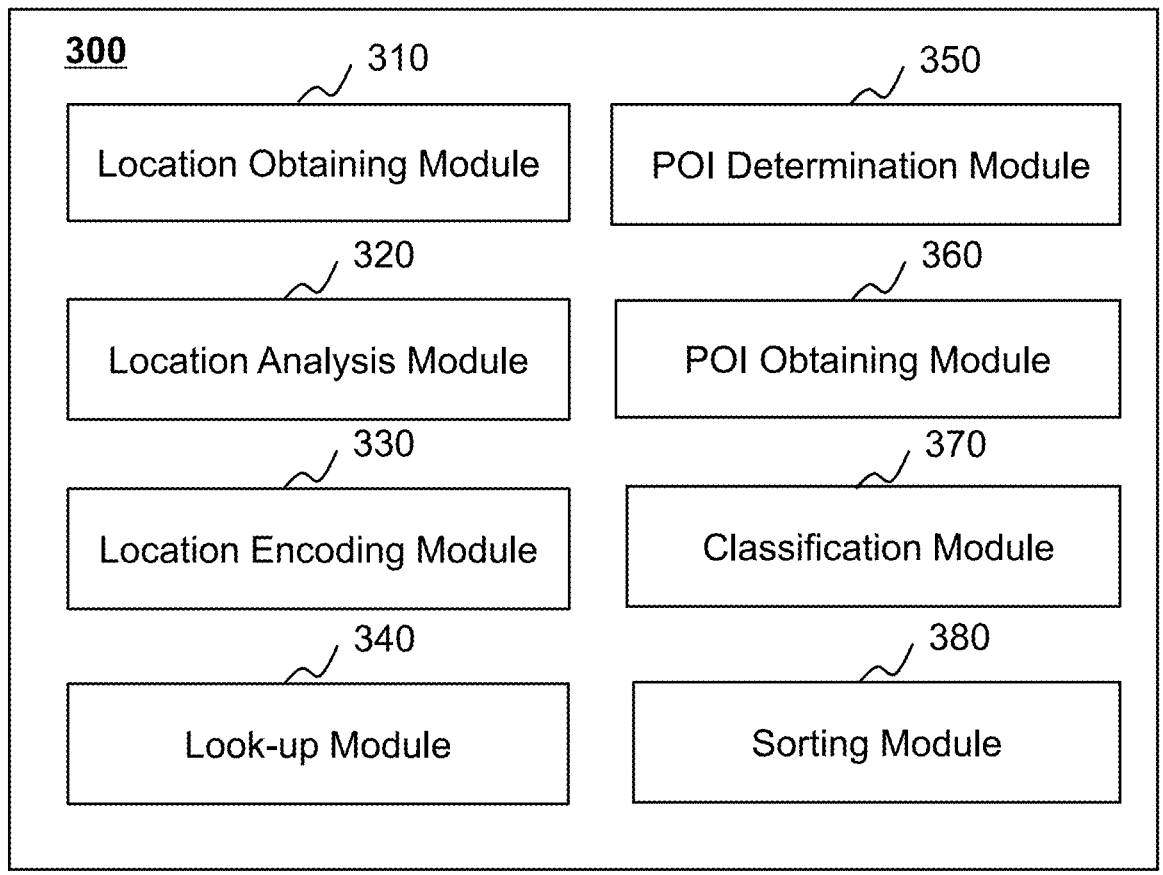
FIG. 3 is a block diagram of an exemplary processor according to some embodiments of the present disclosure.

FIG. 3 is a block diagram of an exemplary processor according to some embodiments of the present disclosure. The processor 300 may be adapted to the server 110, the user terminal 130, and/or the storage 140 according to some embodiments of the present disclosure. In some embodiments, the processor 300 may include a location obtaining module 310, a location analysis module 320, a location encoding module 330, a look-up module 340, a POI determination module 350, a POI obtaining module 360, a classification module 370, and a sorting module 380.

Generally, the word "module" as used herein, refers to logic embodied in hardware or firmware, or to a collection of software instructions. The modules described herein may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on a computing device (e.g., processor 300) can be provided on a computer-readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be included of connected logic units, such as gates and flip-flops, and/or can be included of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

The location obtaining module 310 may obtain a location from the user terminal 130 and/or the storage 140 via the network 120. The location may include a target location associated with a user. For example, the location may include a location of the user terminal 130 held or operated by the user. The location may include a location designated by the user's input through the user terminal 130. The location may also include a plurality of locations used to construct a geocode structure (also referred to herein as sample locations).

The location analysis module 320 may receive the location from the location obtaining module 310. The location analysis module 320 may determine a longitude value and a latitude value of the location when the location doesn't include coordinate information of the location.

The location encoding module 330 may receive the longitude value and the latitude value of the location to determine a geocode value of the location by using an encoding technique. The encoding technique may include Geohash technique, Morton code technique, Hilbert Curve technique, or the like, or a combination thereof.

The look-up module 340 may traverse the geocode structure based on the geocode value of the location to determine at least one related geocode value. The related geocode value may have a common prefix with respect to the geocode value of the location.

The POI determination module 350 may determine a plurality of POIs associated with the location based on the geocode value of the location. The plurality of POIs may be associated with the related geocode value.

The POI obtaining module 360 may obtain a plurality of sample POIs from a data source (e.g., disk 270, ROM 230, RAM 240, or storage 140). The sample POIs may be associated with each of locations. The sample POI may include a name of a location (e.g., the sample location, a location around the sample location), a coordinate of the location (e.g., a longitude value and/or a latitude value), an address of the location (e.g., the state, province, city, district, road, house number), a telephone number relating to the location, a promotional activity, or other types around the location, such as hospitals, schools, parks, roads, bridges, rivers, lakes, mountains, railway stations, airports, companies, residential communities, hotel scenic, spots, or the like, or any combination thereof. The data source may include a database, a network resource, a remote server, or the like, or any combination thereof.

The classification module 370 may classify a plurality of sample locations based on the longitude value and latitude value of each of the plurality of sample locations. The sample locations may be geographic locations stored in a data source. The classification module 370 may store the plurality of sample locations in different servers, and the same kind of sample locations may be stored in the same server. For example, the classification module 370 may store a plurality of sample locations in a first administrative region in a first server and store a plurality of sample locations in a second administrative region in a second server. An administrative region may represent a country, a province, a city, a district, a country, a street, etc.

The sorting module 380 may receive the plurality of POIs from the POI determination module 350 and sort the plurality of POIs based on a sort rule. For example, the sorting module 380 may sort the plurality of POIs in ascending order based on a distance between the target location and a location corresponding to each of the plurality of POIs.

Figure 4:
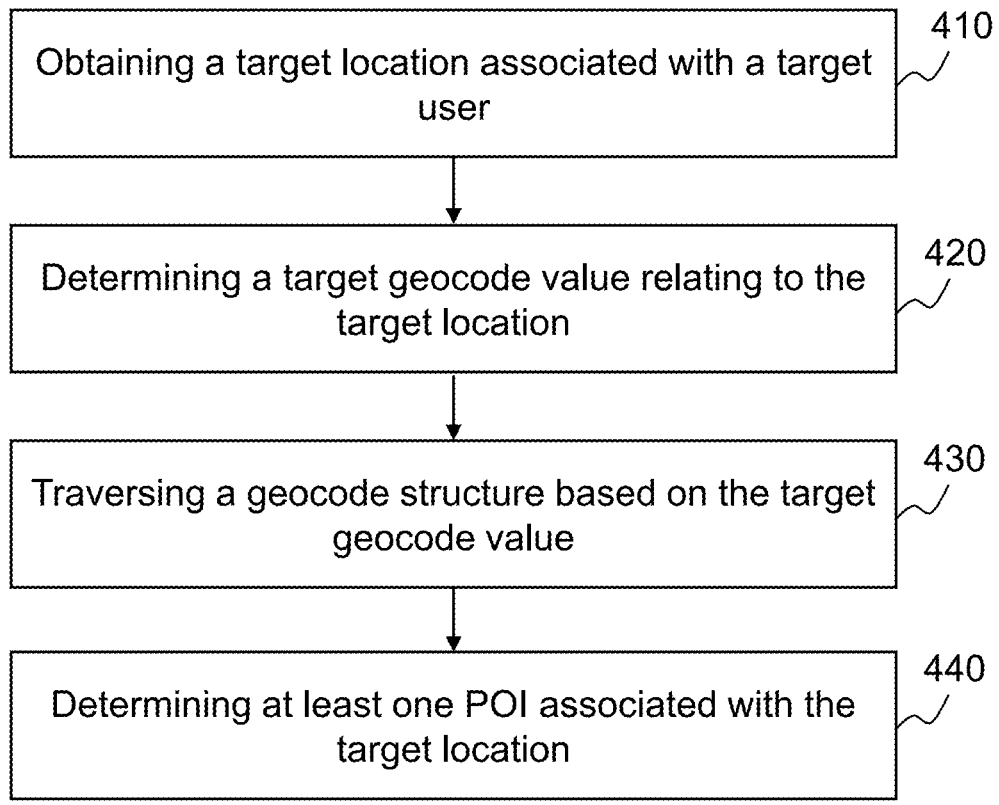
FIG. 4 is a flowchart of an exemplary process for determining POI according to some embodiments of the present disclosure.

FIG. 4 is a flowchart illustrating an exemplary process for determining a point of interest (POI) associated with a target location according to some embodiments of the present disclosure. In some embodiments, the process 400 may be implemented in the on-demand service system 100 as illustrated in FIG. 1. For example, the process 400 may be implemented as one or more sets of instructions and stored in the storage 140 or the processor 300, and called and/or executed by the processor 300.

In 410, the processor 300 (e.g., location obtaining module 310) may obtain a target location associated with a user. In some embodiments, the user may be an individual or entity requesting or ordering a service. For example, the user may be a passenger, a driver, an operator, or the like, or any combination thereof. In some embodiments, the target location may include a current location of the user (via, e.g., the user terminal 130 held or operated by the user) determined by a positioning technology (via, e.g., a terminal held or operated by the user). The positioning technology may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. In some embodiments, the target location may include a location designated by the user's input. For example, the user may indicate his or her (current or anticipated) position by dragging a point-selection icon on a map installed in the user terminal 130 to determine the target location, which may be transmitted by the user terminal 130, via the network 120, to the location obtaining module 310. The target location may be in the form of text, image, audio, video, or the like, or any combination thereof.

In 420, the processor 300 (e.g., location encoding module 330) may determine a geocode value relating to the target location (also referred to herein as a target geocode value) by using an encoding technique. As used herein, the term "geocode value" generally refers to a representation of a geographic location using a code, which may be determined by using an encoding technique. In some embodiments, the target geocode value may be generated based on a longitude value of the target location (also referred to herein as a target longitude value) and a latitude value of the target location (also referred to herein as a target latitude value). The encoding technique to determine a geocode value corresponding to a location may include Geohash technique, Morton code technique, Hilbert Curve technique, or the like, or a combination thereof. The Geohash technique is an encoding method that may convert a two-dimensional location value (e.g., including a longitude value and a latitude value) into a one-dimension value (e.g., a geohash value). Merely by way of example, the target geocode value may be a geohash value (also referred to herein as a target geohash value). The target geohash value may be generated by interleaving bits of the target longitude value and the target latitude value and then converting the bit representation to a base-32 representation.

In 430, the processor 300 (e.g., the look-up module 340) may traverse a geocode structure based on the target geocode value. In some embodiments, the geocode structure may be a structure generated according to process 600 illustrated in FIG. 6. The geocode structure may store a plurality of geocode values. In some embodiments, the geocode structure may include a geocode tree structure. In some embodiments, the geocode structure may include a Trie tree structure. In some embodiments, a technique used for traversing the geocode structure may include sequential search, binary search, index search, blocking search, hash search, or the like, or any combination thereof.

After traversing the geocode structure, in 440, the processor 300 (e.g., the POI determination module 350) may determine at least one POI associated with the target location based on the target geocode value of the target location. In some embodiments, a geocode value may be associated with a plurality of POIs. When a geocode value is determined, the plurality of POIs associated with the geocode value may also be determined. The processor 300 (e.g., the POI determination module 350) may determine POI(s) around the target location based on the geocode value of the target location. The POI relating to the target location may include a name of a location (e.g., the target location, a location around the target location), a coordinate of the location (e.g., a longitude value and/or a latitude value), an address of the location (e.g., state, province, city, district, road, house number), a telephone number relating to the location, a promotional activity, or other types around the location, such as hospitals, schools, parks, roads, bridges, rivers, lakes, mountains, railway stations, airports, companies, residential communities, hotel scenic, spots, or the like, or any combination thereof.

In some embodiments, the POI determination module 350 may determine a plurality of points of interest (POIs) around the target location. In some embodiments, the sorting module 380 in the processor 300 may sort the plurality of POIs based on a sort rule. Merely by way of example, the sorting module 380 may sort the plurality of POIs in ascending order based on a distance between the target location and a location corresponding to each of the plurality of POIs. The POI determination module 350 may provide only a portion of the plurality of POIs recalled (or determined) by the POI determination module 350 to the user via the user terminal 130 based on a sort result.

It should be noted that the above description about the process 400 is merely an example and not intended to be limiting. In some embodiments, the process 400 may include other operations. For example, after obtaining the target location in 410, the processor 300 (e.g., the location analysis module 320) may determine whether the target location includes the coordinates of the target location. If the target location does not include any location coordinates (e.g., the target location is the text description of the location, or a point on a map or a POI entered or selected by the user at the user terminal 130), the location analysis module 320 may determine the target longitude value and the target latitude value associated with the target location.

Figure 5:
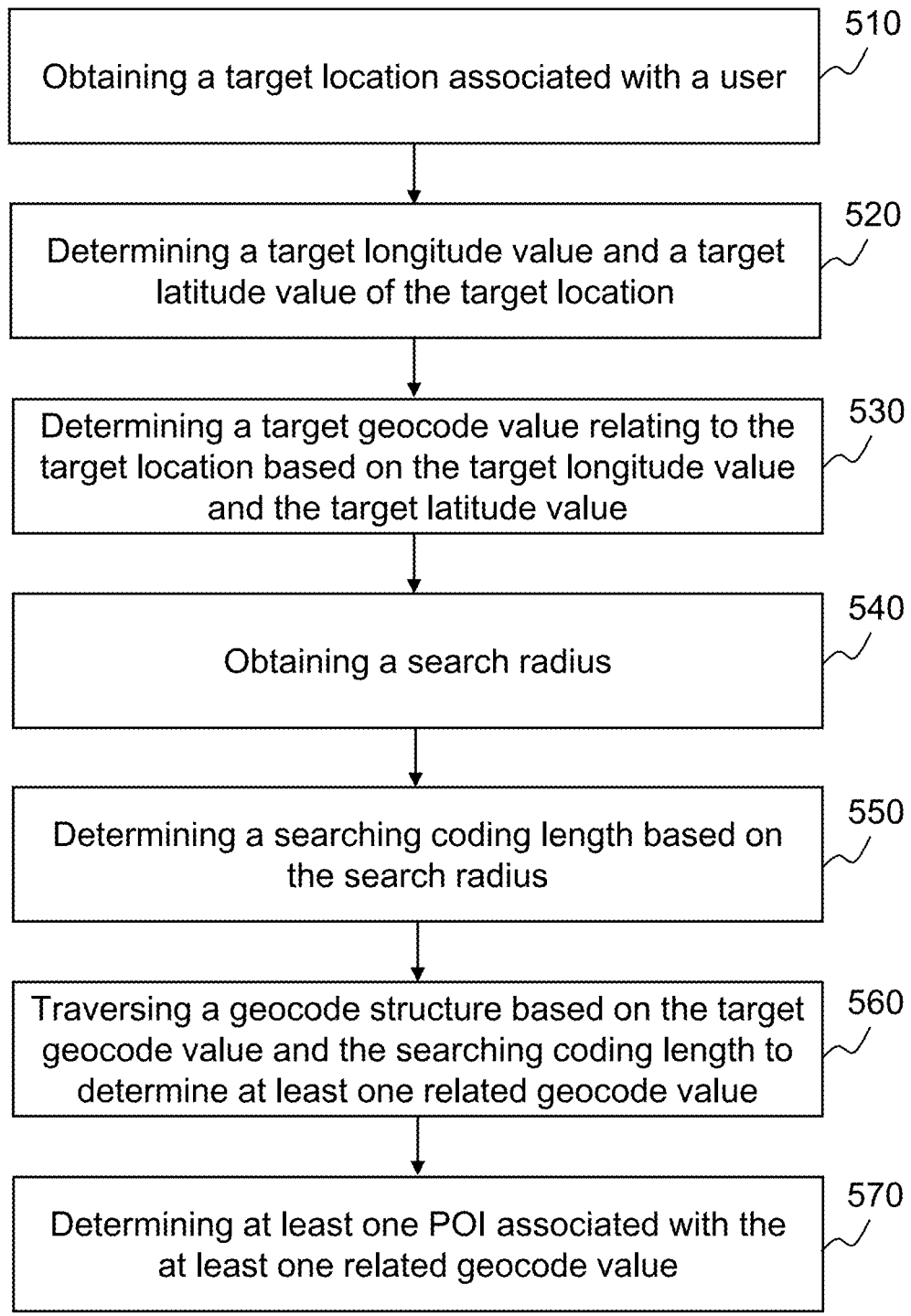
FIG. 5 is a flowchart of another exemplary process for determining POI according to some embodiments of the present disclosure.

FIG. 5 is a flowchart illustrating an exemplary process for determining POI according to some embodiments of the present disclosure. In some embodiments, the process 500 may be implemented in the on-demand service system 100 as illustrated in FIG. 1. For example, the process 500 may be implemented as one or more sets of instructions and stored in the storage 140 or the processor 300, and called and/or executed by the processor 300.

In 510, the processor 300 (e.g., location obtaining module 310) may obtain a target location associated with a user. The target location may be in the form of text, image, audio, video, or the like, or any combination thereof. In some embodiments, the target location may represent location information in two-dimensional location values (e.g., a longitude and latitude pair).

In some embodiments, the processor 300 (e.g., the location analysis module 320) may determine whether the target location includes the coordinates of the target location. If the target location does not include any location coordinates (e.g., the target location is the text description of the location, or a point on a map or a POI is entered or selected by the user via the user terminal 130), the location analysis module 320 may determine a longitude value (also referred to herein as a target longitude value) and a latitude value (also referred to herein as a target latitude value) associated with the target location in 520. In some embodiments, if the process 300 receives a target location in the form of image, audio, or video, the processor 300 may first convert it into text description, and the processor 300 may convert the text description into the location coordinates. In some embodiments, the processor 300 may convert the target location in the form of image, audio, or video into the location coordinates. If the processor 300 determines that the target location includes the coordinates of the target location, the process 500 may skip 520 and proceed to 530.

In 530, the processor 300 (e.g., the location encoding module 330) may determine a target geocode value relating to the target location based on the target longitude value and the target latitude value by using an encoding technique. In some embodiments, the target geocode value may represent location information in a one-dimension format.

In some embodiments, the location encoding module 330 may determine a target geocode value by converting each of the target longitude value and the target latitude value into a binary number, and combine the two binary numbers. For example, the target location may be represented by a location coordinate pair as (6, 8). The first term in the location coordinate pair represents the target longitude value, and the second term in the location coordinate pair represents the target latitude value. The processor 300 may convert the target longitude value and the target latitude value into binary numbers, octal numbers, or hexadecimal numbers, or the like. For illustration purposes, binary numbers are used below as an example. The length of the binary number may be determined based on the real number of the target longitude value and/or target latitude value. In the above example, the binary number of the target longitude value is "0110," and the binary number of the target latitude value is "1000." Then the location encoding module 330 may combine the two binary numbers together to generate the target geocode value. The way of the combination may be arbitrary. In some embodiments, the location encoding module 330 may set the binary number of the target latitude value behind the binary number of the target longitude value (e.g., in this case, the target geocode value is "01101000"). In some embodiments, the processor 300 may set the binary number of the target longitude value behind the binary number of the target latitude value (e.g., the target geocode value is "10000110").

In some embodiments, the processor 300 may determine the target geocode value by using a geohash encoding technique. The target geocode value may include a geohash value (also referred to herein as a target geohash value). The location encoding module 330 may generate the target geohash value by interleaving bits of the target longitude value and the target latitude value and convert the bit representation to a base-32 representation. For example, the location encoding module 330 may first convert the target longitude value and the target latitude value into a binary representation respectively. The location encoding module 330 may also interleave the binary representations of the target longitude value and the target latitude value. The location encoding module 330 may further convert the result of interleaving into a base-32 representation.

In some embodiments, the processor 300 may optionally obtain a search radius in 540. The processor 300 may determine the search radius based on default settings or other factors (e.g., the scale of the map or user preferences). For example, when the processor 300 receives a request for POI(s) around a location, the processor 300 may determine POI(s) around the location within a predetermined range value automatically. The predetermined range value may be a certain value from 0 to 10 kilometers, 10.1 kilometers to 20 kilometers, 20.1 kilometers to 30 kilometers, 30.1 kilometers to 40 kilometers, 40.1 kilometers to 50 kilometers. In some embodiments, the predetermined range value may be from 1 to 100 meters, 101 meters to 200 meters, 201 meters to 300 meters, 301 meters to 400 meters, 401 meters to 500 meters, 501 meters to 600 meters, 601 meters to 700 meters, 701 meters to 800 meters, 801 meters to 900 meters, 901 meters to 1000 meters. In some embodiments, the predetermined range value may be from 0 to 10 meters, 11 meters to 20 meters, 21 meters to 30 meters, 31 meters to 40 meters, 41 meters to 50 meters, 51 to 60 meters, 61 meters to 70 meters, 71 meters to 80 meters, 81 meters to 90 meters, 91 meters to 100 meters.

Alternatively or additionally, the search radius may be set by the user via the user terminal 130. For example, when a user want to get some POIs around a location designated by him or her via the user terminal 130, there may be a selection icon or an input box for a search radius on a user interface of the user terminal 130, and the user may select a search radius or input a search radius in the input box. Then the processor 300 may receive from the user terminal 130 via, for example, the network 120 the search radius designated by the user and determine POI(s) with a range of the search radius. In some embodiments, the search radius may be a default setting of the on-demand service system 100.

Alternatively or additionally, the processor 300 may determine different values of search radius for different locations. For example, the processor 300 may associate a relatively smaller value of search radius relating to a location in center of a city and associate a relatively larger value of search radius relating to a location in a suburban district of the city.

The search radius may include a value from 0 to 50 kilometers or larger than 50 kilometers. In some embodiments, the search radius may be from 0 to 10 kilometers, 10.1 kilometers to 20 kilometers, 20.1 kilometers to 30 kilometers, 30.1 kilometers to 40 kilometers, 40.1 kilometers to 50 kilometers. In some embodiments, the search radius may be from 1 to 100 meters, 101 meters to 200 meters, 201 meters to 300 meters, 301 meters to 400 meters, 401 meters to 500 meters, 501 meters to 600 meters, 601 meters to 700 meters, 701 meters to 800 meters, 801 meters to 900 meters, 901 meters to 1000 meters. In some embodiments, the search radius may be from 0 to 10 meters, 11 meters to 20 meters, 21 meters to 30 meters, 31 meters to 40 meters, 41 meters to 50 meters, 51 to 60 meters, 61 meters to 70 meters, 71 meters to 80 meters, 81 meters to 90 meters, 91 meters to 100 meters.

On the basis of the search radius, the processor 300 may determine one or more POIs associated with the target location within the range of the search radius.

In some embodiments, the processor 300 may determine a searching coding length based on the search radius in 550. The searching coding length may reflect the searching range corresponding to the search radius. The shorter the coding length is, the larger the searching range is. Assume that the target geocode value is "01101000," the length of the target geocode value is 8, and a first coding length associated with the search radius is 2 when the search radius is 50 meters, then the processor 300 may determine the searching coding length to be 6 (i.e., 8−2=6) based on the first coding length and the length of the target geocode value.

In 560, the processor 300 (e.g., the look-up module 340) may traverse a geocode structure based on the target geocode value and the searching coding length to determine at least one related geocode value. The related geocode value may correspond to locations within a range (e.g., the search radius) of the target location. In some embodiments, the geocode structure used in 560 may be generated according to process 600 illustrated in FIG. 6. The geocode structure may store a plurality of geocode values. In some embodiments, the geocode structure may include a geocode tree structure. In some embodiments, the geocode structure may include a Trie tree structure. The related geocode value may have a common prefix with respect to the target geocode value. The common prefix may include one or more characters shared by two or more geocode values. For example, at least a first character of a first geocode value and a first character of a second geocode value may be substantially identical. In some embodiments, a prefix of a geocode value may be a set of consecutive characters of the geocode value including at least the first character of the geocode value. A suffix of the geocode value is the remaining set of consecutive characters that have not been chosen as the prefix (e.g., the characters after the prefix). The length of a common prefix may be determined based, at least in part, on the search radius. For example, if the target geocode value is "01101000," the search radius is 50 meters, a first coding length associated with the search radius is 2, so the length of the common prefix may be determined as six (i.e., 8−2=6) and the common prefix may be "011010." The related geocode value may include at least one geocode value having a prefix "011010."

In some embodiments, a construction module (not shown in FIG. 3) of the processor 300 may determine a hash index for each node in the geocode tree structure. The look-up module 340 may determine a node based on the hash index. The hash index generally refers to a map relationship between a key associated with the node and the position of the node. For example, if the target geocode value is "01101000," the searching coding length is 6, the look-up module 340 may determine a position of a node associated with a string (e.g., "011010") based on the hash index. All descendants (also referred to herein as leaf nodes or child nodes) of the node have a common prefix (e.g., "011010") of a string associated with the node. Then the at least one related geocode value may be a string associated with a descendant of the node.

In 570, the processor 300 (e.g., the POI determination module 350) may determine at least one POI associated with the at least one related geocode value. The processor 300 may determine the at least one POI as the POI associated with the target location. The POI may include a name of the specific location, a coordinate of the specific location (e.g., a longitude value and/or a latitude value), an address of the specific location (e.g., state, province, city, district, road, house number), a telephone number relating to the specific location, a promotional activity, or the like, or any combination thereof.

Figure 7:
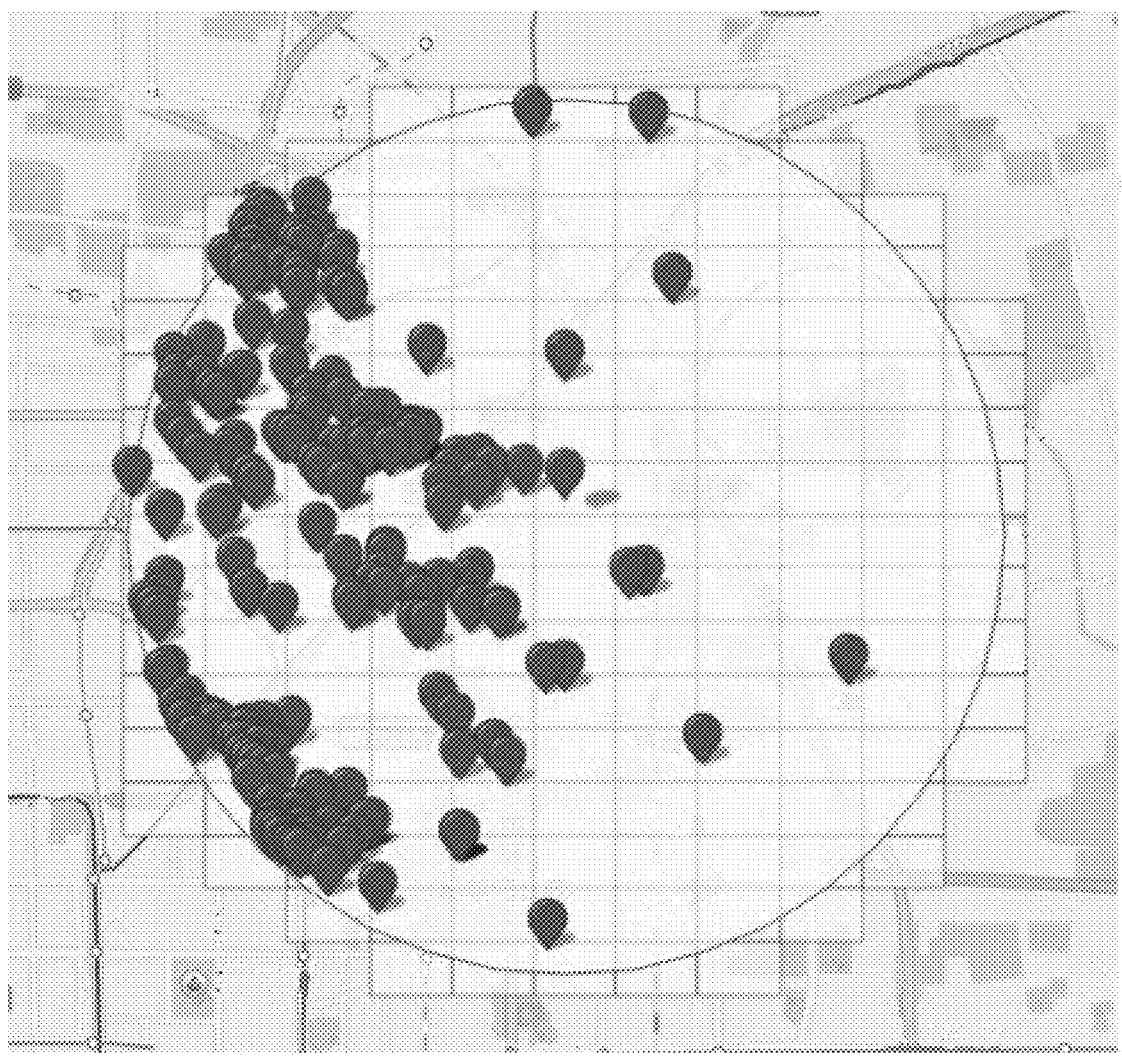
FIG. 7 shows a search result for determining POI according to some embodiments of the present disclosure.

It should be noted that the above description about the process 500 is merely an example and not intended to be limiting. In some embodiments, the process 500 may include other operations. For example, after determining a target geocode value relating to the target location, the processor 300 (e.g., the location encoding module 330) may, in 530, obtain a neighboring location geocode value corresponding to the target location. The neighboring location geocode value may relate to a geographic location around the target location. The neighboring location geocode value may be associated with one or more POIs. After obtaining the neighboring location geocode code, the look-up module 340 may determine the at least one POI based on the neighboring location geocode value, the target geocode value, and the searching coding length. In some embodiments, after determining a plurality of POIs around the target location and the neighboring location, the sorting module 380 of the processor 300 may sort the plurality of POIs based on a sort rule. Merely by way of example, the sorting module 380 may sort the plurality of POIs in ascending order based on a distance between the target location and a location corresponding to each of the plurality of POIs. Alternatively or additionally, the POI determination module 350 may transmitted the plurality of POIs to the user terminal 130, which may be displayed at a user interface of the user terminal 130 (e.g., displayed as the pointers shown in FIG. 7).

Figure 6:
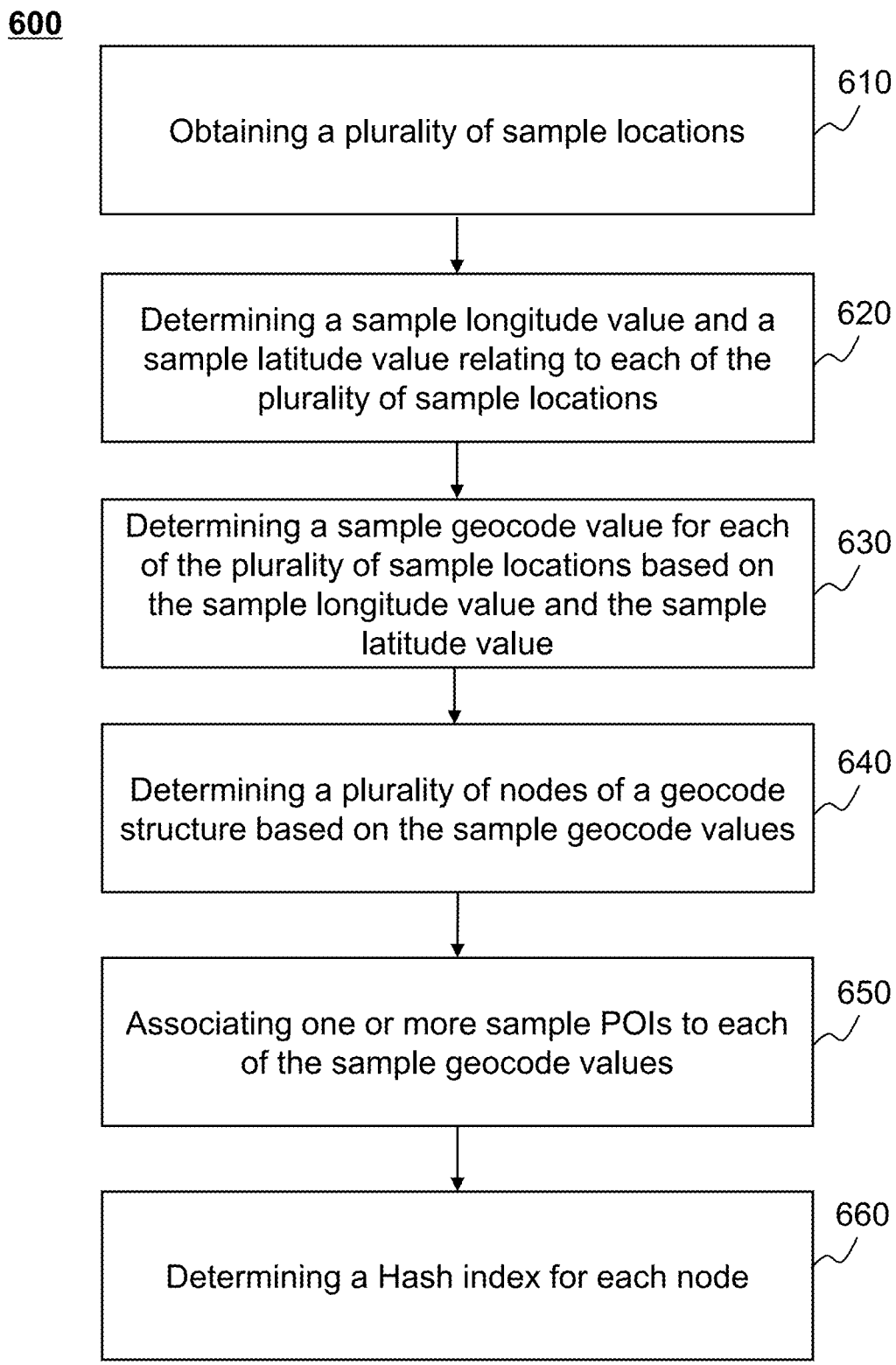
FIG. 6 is a flowchart of an exemplary process for constructing a geocode structure according to some embodiments of the present disclosure.

FIG. 6 is a flowchart illustrating an exemplary process for generating a geocode structure according to some embodiments of the present disclosure. The geocode structure generated according to the process 600 may be used in step 430 of the process 400 and step 560 of the process 500 for determining a POI as described elsewhere in this disclosure.

In some embodiments, the process 600 may be implemented in the on-demand service system 100 as illustrated in FIG. 1. The process 600 may be implemented in the server 110, the user terminal 130, or the storage 140. For example, the process 600 may be implemented as one or more sets of instructions and stored in the storage 140 or the processor 300, and called and/or executed by the processor 300. In some embodiments, all of the process 600, the process 400, and/or the process 500 may be called and/or executed by the processor 300 in the server 110. In some embodiments, the process 600 may be implemented in the server 110 or the storage 140, the process 400 and/or the process 500 may be called and/or executed by the processor 300 in the user terminal 130.

In 610, the processor 300 (e.g., the location obtaining module 310) or a different processor may obtain a plurality of locations (also referred to herein as sample locations). In some embodiments, the sample locations may be geographic locations stored in a data source. The data source may include a database, a network resource, a remote server, or the like, or any combination thereof. The sample locations may be in the form of text, image, audio, video, or the like, or any combination thereof.

In some embodiments, before obtaining a plurality of sample locations, the classification module 370 may classify a plurality of sample locations based on the longitude value and latitude value of each of the plurality of sample locations. Then classification module 370 may store the plurality of sample locations in different servers, and the same kind of sample locations may be stored in the same server. In some embodiments, sample locations in a same geographic region may be regarded as being the same kind. For example, the classification module 370 may store a plurality of sample locations in a first administrative region in a first server and store a plurality of sample locations in a second administrative region in a second server. An administrative region may represent a country, a province, a city, a district, a country, a street, etc.

In some embodiments, the sample locations obtained in 610 may include a location coordinate value. In some embodiments, the sample locations obtained in 610 may not include a location coordinate value, and the processor 300 may convert the sample locations into a location coordinate value.

In 620, the processor 300 (e.g., the location analysis module 320) or a different processor may determine a longitude value (also referred to herein as a sample longitude value) relating to each of the plurality of sample locations and a latitude value (also referred to herein as a sample latitude value) relating to each of the plurality of sample locations.

In 630, the processor 300 (e.g., the location encoding module 330) or a different processor may determine a sample geocode value for each of the plurality of sample locations based on the sample longitude value and the sample latitude value. The process of determining the sample geocode value for each of the plurality of sample locations may be similar to the process of determining the target geocode value relating to the target location, for example, by using Geohash technique (e.g., as previously described in connection with step 530 of the process 500).

In 640, the processor 300 (e.g., the construction module) or a different processor may determine a plurality of nodes of a geocode structure based on the sample geocode values. In some embodiments, the geocode structure may include a geocode tree structure. In some embodiments, the geocode structure may include a Trie tree structure. The geocode structure may include a plurality of nodes that may store the plurality of sample geocode values. In some embodiments, a node of the geocode tree structure may be associated with a plurality of sample geocode values. In some embodiments, a node of the geocode tree structure may be associated with one sample geocode value.

In 650, the processor 300 (e.g., the construction module) or a different processor may associate one or more sample POIs to each of the sample geocode values. The POI obtaining module 360 may obtain a plurality of sample POIs from a data source. The POIs may be associated with each of the sample locations. The sample POI may include a name of a location (e.g., the sample location, a location around the sample location), a coordinate of the location (e.g., a longitude value and/or a latitude value), an address of the location (e.g., state, province, city, district, road, house number), a telephone number relating to the location, a promotional activity, or other types around the location, such as hospitals, schools, parks, roads, bridges, rivers, lakes, mountains, railway stations, airports, companies, residential communities, hotel scenic, spots, or the like, or any combination thereof. In some embodiments, a sample geocode value may be associated with one or more sample POIs. If a geocode value is determined, the one or more POIs associated with the geocode value may also be determined.

In some embodiments, the process 600 may further include determining a Hash index for each node of the geocode structure. In 660, the processor 300 (e.g., the construction module) or a different processor may determine a Hash index for each node. The hash index may be a map relationship between a key associated with a node and the position of the node. In some embodiments, the processor 300 may generate the hash index by computing a hash value for each of the node in the geocode tree structure. A hash value of a node may represent a path from the root node to the node. The hash value of each node may quickly locate the position of the node in the geocode tree structure with a given search key (e.g., the target geocode value).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may connect to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

I claim:

1. A system configured to operating an online on-demand service platform, comprising:
   a bus;
   a storage medium electronically connected to the bus, including a set of instructions for determining a point of interest (POI); and
   logic circuits in communication with the storage medium via the bus, wherein when executing the set of instructions, the logic circuits are configured to cause the system to:
      receive, from a terminal, electronic signals including information relating to a target location associated with a user;
      determine a target geocode value relating to the target location;
      obtain a geocode structure for determining POIs, the geocode structure including a geocode tree structure;
      obtain a search radius;
      determine a searching coding length based on a coding length of the search radius and a coding length of the target geocode value;
      determine at least one related geocode value in the geocode tree structure based on the target geocode value and the searching coding length by using a search technique; and
      determine at least one POI relating to the target location based, at least in part, on the at least one related geocode value and the geocode structure.

2. The system of claim 1, wherein to determine the target geocode value relating to the target location, the logic circuits are further configured to cause the system to:
   determine a target longitude value of the target location and a target latitude value of the target location based on the information relating to the target location associated with the user; and
   determine the target geocode value relating to the target location based on the target longitude value of the target location and the target latitude value of the target location by using an encoding technique.

3. The system of claim 1, wherein each of the at least one related geocode value has a common prefix with respect to the target geocode value.

4. The system of claim 3, wherein the logic circuits are further configured to cause the system to: determine, based on the search radius, length of the common prefix.

5. The system of claim 1, wherein the geocode tree structure includes a plurality of nodes, and each of the plurality of nodes is associated with one or more sample geocode values representing one or more sample locations.

6. The system of claim 1, wherein the geocode structure is generated by a process for generating a geocode structure, the process comprising:
   obtaining a plurality of sample locations from a storage device;
   determining a sample longitude value and a sample latitude value for each of the plurality of sample locations;
   determining a sample geocode value for the each of the plurality of sample locations based on the sample longitude value of the each of the plurality of sample locations and the sample latitude value of the each of the plurality of sample locations;
   generating a plurality of nodes of the geocode structure based on the sample geocode values; and
   saving the geocode structure into the storage device.

7. The system of claim 6, wherein the process for generating a geocode structure further comprises associating one or more sample POIs to each of the sample geocode values in the geocode structure.

8. The system of claim 6, wherein the process for generating a geocode structure further comprises determining a Hash index for the plurality of nodes of the geocode structure.

9. The system of claim 1, wherein the geocode structure includes a Trie tree structure.

10. The system of claim 1, wherein the logic circuits are further configured to cause the system to:
    determine a neighboring location geocode value corresponding to the target location; and
    determine the at least one POI relating to the target location based, at least in part, on the neighboring location geocode value.

11. A method implemented in a computing device for determining a POI, comprising:
    receiving, by first logic circuits from a terminal, electronic signals including information relating to a target location associated with a user;
    determining, by the first logic circuits, a target geocode value relating to the target location;
    obtaining, by the first logic circuits, a geocode structure for determining POIs, the geocode structure including a geocode tree structure;
    obtaining, by the first logic circuits, a search radius;
    determining, by the first logic circuits, a searching coding length based on a coding length of the search radius and a coding length of the target geocode value;
    determining, by the first logic circuits, at least one related geocode value in the geocode tree structure based on the target geocode value and the searching coding length; and
    determining, by the first logic circuits, at least one POI relating to the target location based, at least in part, on the at least one related geocode value and the geocode structure.

12. The method of claim 11, wherein determining, by the first logic circuits, the target geocode value relating to the target location comprises:
  determining a target longitude value of the target location and a target latitude value of the target location based on the information relating to the target location associated with the user; and
  determining the target geocode value relating to the target location based on the target longitude value of the target location and the target latitude value of the target location by using an encoding technique.

13. The method of claim 11, wherein each of the at least one related geocode value has a common prefix with respect to the target geocode value.

14. The method of claim 13, wherein the method further comprises: determining, by the first logic circuit, length of the common prefix based on the search radius.

15. The method of claim 11, wherein the geocode structure is generated by a process for generating a geocode structure, the process comprising:
  obtaining, by second logic circuits, a plurality of sample locations from a storage device;
  determining, by the second logic circuits, a sample longitude value and a sample latitude value for each of the plurality of sample locations;
  determining, by the second logic circuits, a sample geocode value for the each of the plurality of sample locations based on the sample longitude value of the each of the plurality of sample locations and the sample latitude value of the each of the plurality of sample locations;
  generating, by the second logic circuits, a plurality of nodes of the geocode structure based on the sample geocode values; and
  saving, by the second logic circuits, the geocode structure into the storage device.

16. The method of claim 15, wherein the first logic circuits and the second logic circuits are different.

17. The method of claim 15, wherein the process for generating a geocode structure further comprises associating, by the second logic circuits, one or more sample POIs to each of the sample geocode values in the geocode structure.

18. The method of claim 15, wherein the process for generating a geocode structure further comprises:
  determining, by the second logic circuits, a Hash index for the plurality of nodes of the geocode structure.

19. The method of claim 11, further comprising:
  determining, by the first logic circuits, a neighboring location geocode value corresponding to the target location; and
  determining, by the first logic circuits, the at least one POI relating to the target location based, at least in part, on the neighboring location geocode value.

20. A non-transitory computer readable medium embodying a computer program product, the computer program product comprising instructions configured to cause a computing device to:
  receive, from a terminal, electronic signals including information relating to a target location associated with a user;
  determine a target geocode value relating to the target location;
  obtain a geocode structure for determining POIs, the geocode structure including a geocode tree structure;
  obtain a search radius;
  determine a searching coding length based on a coding length of the search radius and a coding length of the target geocode value;
  determine at least one related geocode value in the geocode tree structure based on the target geocode value and the searching coding length by using a search technique; and
  determine at least one POI relating to the target location based, at least in part, on the at least one related geocode value and the geocode structure.

* * * * *